(12) United States Patent
Hatalsky

(10) Patent No.: US 7,466,870 B2
(45) Date of Patent: Dec. 16, 2008

(54) APPARATUS AND METHOD FOR CREATING EFFECTS IN VIDEO

(75) Inventor: Jeffrey F. Hatalsky, Framingham, MA (US)

(73) Assignee: Acoustic Technology LLC, Las Vegas, NV (US)

( * ) Notice: Subject to any disclaimer, the term of this patent is extended or adjusted under 35 U.S.C. 154(b) by 1303 days.

(21) Appl. No.: 10/345,851

(22) Filed: Jan. 16, 2003

(65) Prior Publication Data

US 2004/0141721 A1  Jul. 22, 2004

(51) Int. Cl.
*G06K 9/40* (2006.01)
*G09G 5/00* (2006.01)
*G06K 9/68* (2006.01)

(52) U.S. Cl. .................... 382/260; 345/581

(58) Field of Classification Search ............ 382/164, 382/166, 173, 232, 254, 255, 276, 260–266, 382/277, 284, 305, 219, 220; 345/435, 581; 375/240.29; 348/586, 597, E5.052
See application file for complete search history.

(56) References Cited

U.S. PATENT DOCUMENTS

| | | | | |
|---|---|---|---|---|
| 5,611,000 A * | 3/1997 | Szeliski et al. | ............ | 382/294 |
| 6,137,919 A * | 10/2000 | Gonsalves et al. | .......... | 382/284 |
| 6,269,195 B1 * | 7/2001 | Gonsalves et al. | .......... | 382/284 |
| 6,426,755 B1 * | 7/2002 | Deering | .................... | 345/581 |
| 6,594,399 B1 * | 7/2003 | Camus et al. | ............... | 382/260 |
| 6,728,317 B1 * | 4/2004 | Demos | ................. | 375/240.21 |
| 6,925,210 B2 * | 8/2005 | Herf | .......................... | 382/264 |
| 6,973,218 B2 * | 12/2005 | Alderson et al. | ........... | 382/260 |
| 7,039,222 B2 * | 5/2006 | Simon et al. | ............... | 382/118 |
| 2004/0141721 A1 * | 7/2004 | Hatalsky | ..................... | 386/52 |

* cited by examiner

*Primary Examiner*—Amir Alavi

(57) ABSTRACT

Creating a blur in a digital image by receiving original pixel values in a frame of image data, and for each pixel position in the digital image being blurred, calculating a blurred pixel value by applying a box filter having a plurality of elements with unity multiplier values to original pixel values for pixel positions that include the pixel position and pixel positions that are nearby to it. The output of the first box filter can be sequentially applied as inputs to a second box filter.

28 Claims, 3 Drawing Sheets

| 1 | 1 | 1 | 1 | 1 |
FIG. 7
| 1 | 2 | 3 | 4 | 5 | 4 | 3 | 2 | 1 |
FIG. 8
| 1 | 3 | 6 | 10 | 15 | 19 | 22 | 24 | 25 | 24 | 22 | 19 | 15 | 10 | 6 | 3 | 1 |
FIG. 9
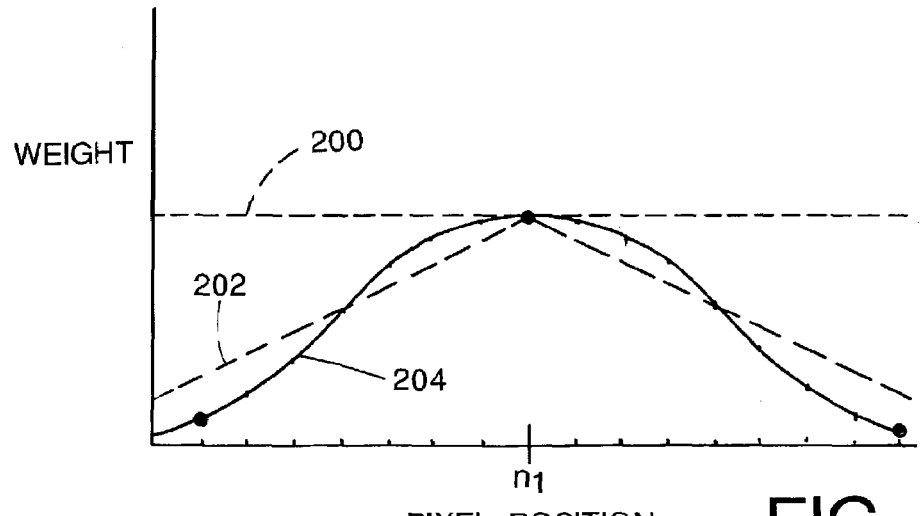
FIG. 10
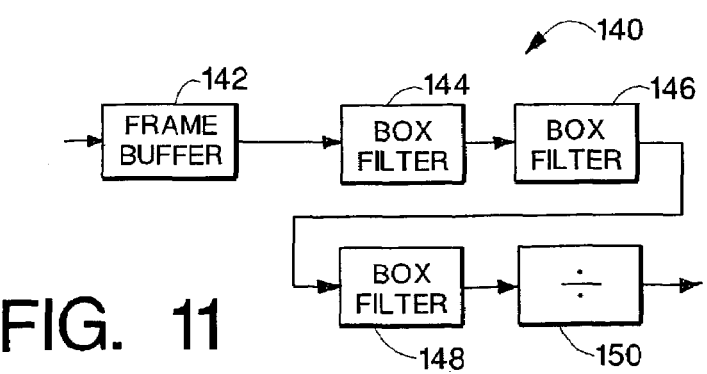
FIG. 11

APPARATUS AND METHOD FOR CREATING EFFECTS IN VIDEO

TECHNICAL FIELD

The invention relates to modifying video.

BACKGROUND

When a video program is created at a nonlinear video editing and compositing system, analog video source materials are typically digitized, compressed and stored on disc for later random access for use in creating a video program. Digital source video can also be input into the nonlinear video editor. Segments of the video, also referred to as "video clips," can be taken from different sources, and the beginning and end points can be trimmed as desired during editing. The order of clips is established in a time line to determine the sequence, and the position of a clip can be changed. Clips can be deleted or inserted as desired. During the editing process, the clips of compressed video can be randomly accessed, decompressed and viewed in real time. The source video can be modified by various effects such as scale, rotate, blur using hardware or software filters to manipulate pixels on the fly in real time or offline.

A blur can be created by replacing the value for a pixel with a new value based upon the original values for that pixel and nearby pixels, with the values of the closer pixels being weighted more than the value of pixels that are further away. The new pixel value $P_{blur}$ is a convolution, i.e., a sum of weighted values, given by the following formula:

$$P_{blur} = \Sigma P_i * W_i$$

Where: $P_i$ equals the value of pixel i, which is a neighbor of the pixel being calculated or the pixel itself, and
$W_i$ equals the weight for pixel i.

If the weights are calculated using a Gaussian distribution, a blur will simulate a defocused image and be visually pleasing. The Gaussian weights $W_{gi}$ can be calculated using the following formula:

$$W_{gi} = e^{-x2/c2},$$

Where: x is the distance from pixel i to the pixel being calculated, and c is a constant.

Calculation of each blurred pixel value requires n multiply operations and n add operations, where n is the number of pixels used in the blur. E.g., if the blur were based on the values of pixels in 101 pixels in the same row and 101 pixels in the same column, there would be 202 multiplications and 202 additions to obtain a single blurred pixel value. This process would then need to be repeated for each pixel being blurred in each frame of the video program being subjected to the blur.

SUMMARY

In one aspect, the invention features, in general, creating a blur in a digital image by receiving original pixel values in a frame of image data, and for each pixel position in the digital image being blurred, calculating a blurred pixel value by applying a box filter having a plurality of elements with unity multiplier values to original pixel values for pixel positions that include the pixel position and pixel positions that are nearby to it.

In another aspect, the invention features, in general, creating a blur in a digital image by calculating, for each pixel position in the digital image being blurred, a blurred pixel value by sequentially applying the original pixel values as inputs to a first box filter that has a plurality of elements and by sequentially applying the outputs of the first box filter as the inputs to a second box filter.

Particular embodiments of the invention may include one or more of the following features. The outputs of the second box filter can be sequentially applied as the inputs to a third box filter. Additional box filters can be added if desired. The elements of the box filters can have unity multiplier values. Each box filter can be implemented by a storage area that maintains a current filter output and an adder and subtracter to update the filter output each time that a new input is received by g the new input to the current filter output and subtracting the input that had been received m pixel positions earlier, where m is the number of elements in the box filter.

Embodiments of the invention may have one or more of the following advantages. Gaussian type blurs can be simply and quickly created with a small number of operations and/or a small number of hardware components by employing multiple box filters in series.

Other aspects and features of the invention will be apparent from the detailed description below and from the claims.

DESCRIPTION OF DRAWINGS

FIG. 7 is a representation of the five-component sequence that results from passing a single pixel value of 1.0 through the five-element box filter of FIG. 4.

FIG. 8 is a representation of the nine-component sequence that results from passing the five-component output of FIG. 6 through a five-element box filter that has unity (1.0) multiplier values.

FIG. 9 is a representation of the seventeen-component sequence that results from passing the nine-component output of FIG. 7 through a nine-element box filter that has unity (1.0) multiplier values.

FIG. 10 is a graph illustrating the weighting functions resulting from use of different numbers of box filters in sequence.

FIG. 11 is an alternative embodiment of a blur effects subsystem used to create a blur effect on image data.

DETAILED DESCRIPTION

Figure 1:
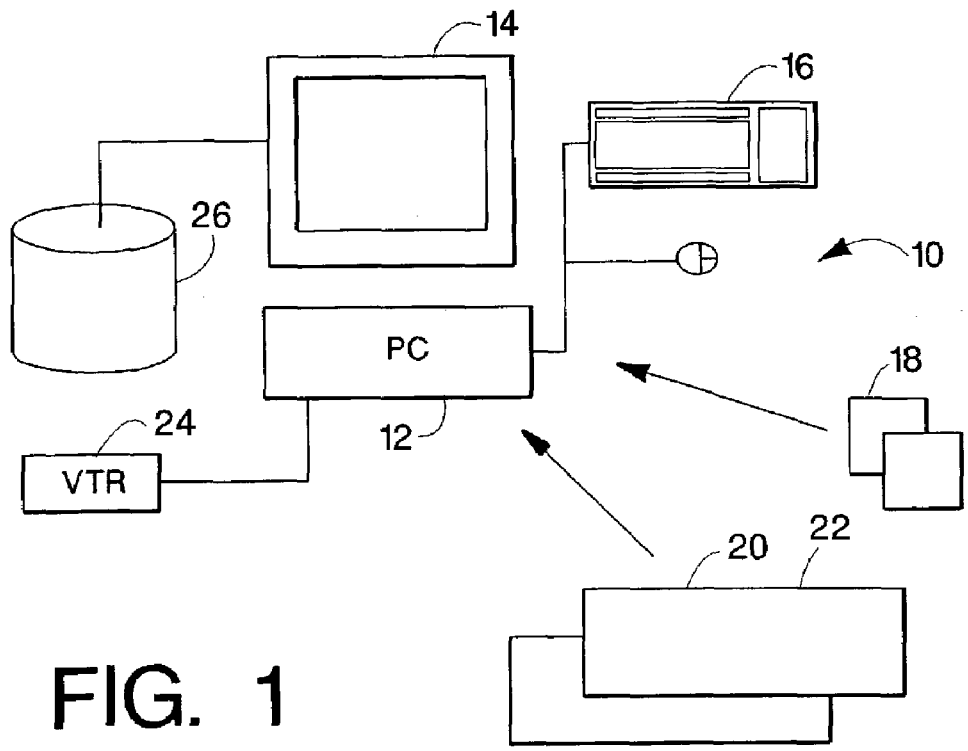
FIG. 1 is a box diagram of a video editing and compositing system.

Referring to FIG. 1, nonlinear video editing and compositing system 10 includes host computer 12 having monitor 14, user input devices 16 (e.g., keyboard and mouse), video editing and compositing software 18, video editing peripheral board 20 in an expansion slot of computer 12, plug-in video hardware filters 22 in expansion slots of computer 12 or otherwise connected thereto, video tape recorder (VTR) 24, and mass storage disc 26.

Figure 2:
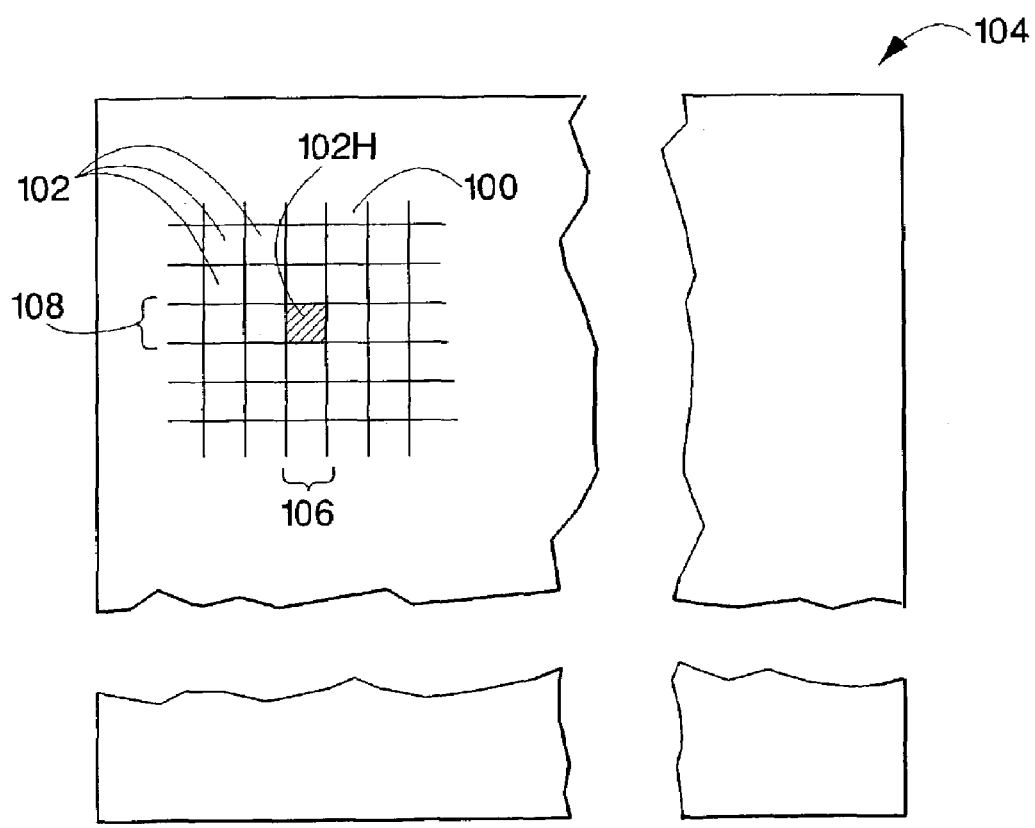
FIG. 2 is a diagram of a frame of pixels.

FIG. 2 shows a five-by-five block 100 of pixels 102 in a frame 104 of image data processed in video editing and compositing system 10. Central pixel 102H is located in column 106 and row 108. In creating a blur effect for the frame of image data, the value for each pixel being blurred is replaced by a new value based upon that pixel's original value and the value of nearby pixels in the same column and same row. System 10 employs sequential box filter operations to create modified pixel values with a reduced number of mathematical operations as compared to the convolution procedure described earlier.

Figure 3:
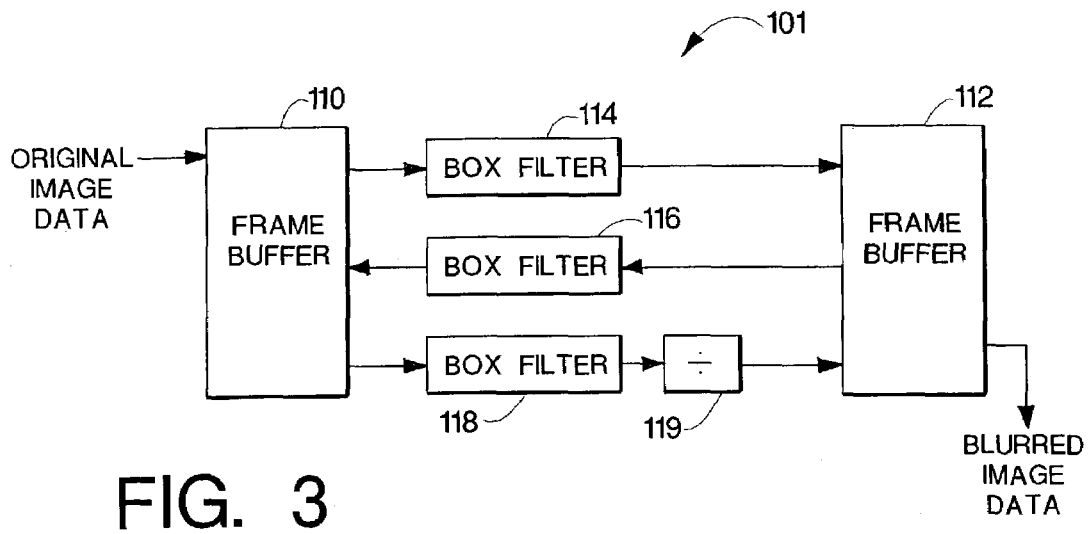
FIG. 3 is a diagram of a blur effects subsystem of the FIG. 1 system.

Referring to FIG. 3, video effects subsystem 101 of video editing and compositing system 10 includes first and second frame buffers 110, 112, two five-element box filters 114, 116, a nine-element box filter 118, and a divider 119. Video effects subsystem 101 can be implemented in a plug-in hardware filter 22, in other hardware, or in software 18 (using random access memory in computer 12 for the frame buffers).

Figure 4:
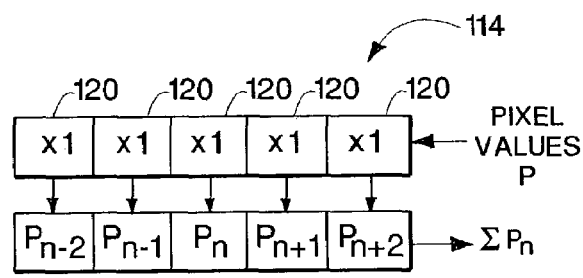
FIG. 4 is a representation illustrating the operation of a five-element box filter that has unity (1.0) multiplier values.

Referring to FIG. 4, five-element box filter 114 has five elements 120, each having unity (1.0) multiplier values. Filter 114 receives pixel values P in sequence, and the values are passed from one element 120 to the next. Each element 120 provides an intermediate result 122, which is the product of 1.0 times the pixel value presented to that element 120 at a particular time. The output 124 of box filter 114 at each time is the sum of intermediate results 122 at that time. FIG. 4 shows the pixel values $P_{n-2}$, $P_{n-1}$, $P_n$, $P_{n+1}$, $P_{n+2}$ as the intermediate results for the case where the value for pixel n, Pn, is in the central position. Output 124 for pixel n is $\Sigma P_n$, which is given by the following formula:

$$\Sigma P_n = P_{n-2} + P_{n-1} + P_n + P_{n+1} + P_{n+2}$$

Figure 5:
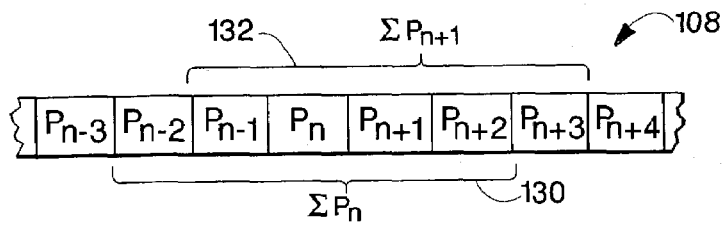
FIG. 5 is a representation illustrating application of the FIG. 4 box filter to a row of pixel data.

Referring to FIG. 5, the application of box filter 114 to a portion of row 108 of pixel values is shown. The pixel values include:

$$P_{n-3} P_{n-2} P_{n-1} P_n P_{n+1} P_{n+2} P_{n+3} P_{n+4}$$

Bracket 130 shows the five pixel values present in elements 120 of box filter 114 (which are also the intermediate values 122, owing to the unity multiplier values for each element) for the case when pixel n is in the central position so as to provide and output of $\Sigma P_n$. Bracket 132 shows the five pixel values present in elements 120 of box filter 114 (which are also the intermediate values 122) for the case when pixel n+1s in the central position so as to provide an output of $\Sigma P_{n+1}$. $\Sigma P_n$ is given by the formula set forth above. $\Sigma P_{n+1}$ is given by the following formula:

$$\Sigma P_{n+1} = P_{n-1} + P_n + P_{n+1} + P_{n+2} + P_{n+3}$$

It is seen that the filter output for pixel n+1 is related to the output for pixel n in that $P_{n-2}$ has been dropped from the left and $P_{n+3}$ is has been added at the right. $\Sigma P_{n+1}$ can thus be derived from $\Sigma P_n$ using the following formula:

$$\Sigma P_{n+1} = \Sigma P_n + P_{n+3} - P_{n-2}$$

Figure 6:
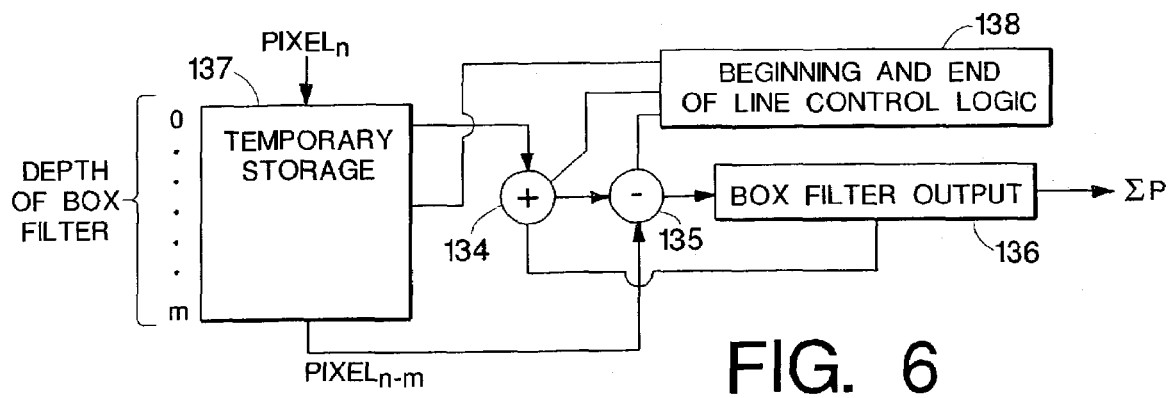
FIG. 6 is a diagram of components of the FIG. 4 box filter.

An adder, a subtracter, and a storage element to store the current value of $\Sigma P$ can thus implement box filter 114. Referring to FIG. 6, box filter 114 is shown implemented by adder 134, subtracter 135, and register 136. Temporary storage 137 (the same size as the number of elements 122 in the box filter times the bits in each pixel value) is used to provide the values being subtracted without the need to access the frame buffer 110, which is a less preferred alternative. Logic 138 is used to handle the situation at the beginning and end of lines before the elements 122 of the box filter have been filled up. Logic 138 can either provide constants (e.g., 0 or black) or mirror the values inside the image at the edge. After this priming to get the initial values for $\Sigma P$ at the beginning of a line, each new $\Sigma P$ can be determined by adding the new value at the right at adder 134 and subtracting the left-most value, which, for a box filter having m elements, is the value that had been received m pixel positions earlier, at subtracter 135. Box filters of additional elements, e.g., nine-element filter 118 (or even much larger filters with, e.g., 101 elements) can also be implemented with the same components. The box filter shown in FIG. 6 can be implemented in hardware or software, and result in a video effects subsystem that is more efficient in transistors (for hardware) and time (for software) than prior approaches.

Box filter 114 can be applied to the original pixel data in the rows in frame buffer 110, processing one row at time and placing the modified pixel values in the corresponding positions in frame buffer 112 to blur the pixel values in a horizontal manner. Box filter 114 can then be applied to the modified pixel values in frame buffer 112, processing one column at a time and placing the modified pixel values in the corresponding positions in frame buffer 110 to create a blur effect with both horizontal and vertical blurring. The values could be divided by 5 (implemented as a multiply times the inverse) before storage in each frame buffer, or by 10 before storage in one of the frame buffers, to provide scaling. (The values could also be scaled upon final removal from or prior to original storage in a frame buffer.) While such an effect can be implemented with a small number of components and a small number of operations, equal weight is given to all twenty-five original values in the 5×5 box in which the pixel is centered. Such equal weight blurring is generally not as desirable as blurring that gives a higher weight to closer pixel positions.

FIGS. 7-9 illustrate how box filters can be used in series in order to provide gradually increased weighting for closer pixel positions. For purposes of the illustration, assume that there is a single pixel value of 1.0 at one pixel position n in frame buffer 110, and zero values for all other pixel positions in a sequence (i.e., row or column) of original pixel data. FIG. 7 shows the sequence that results from passing the single pixel value of 1.0 through the five-element box filter 114 of FIGS. 3 and 4. It is seen that this results in values of 1.0 being output five times. If these output values are stored in a frame buffer 112, the 1.0 value of the pixel at position n is spread out to two neighbors on each side. In implementation, this would result in a constant weighting, as shown by curve 200 on the weighting graph shown in FIG. 10.

FIG. 8 shows what happens when the result of FIG. 6 (values of 1.0 at five adjacent positions, and zero for all other pixel positions) is then passed through a second five-element box filter (e.g., 116) having unity (1.0) multiplier values. The filter output 124 ($\Sigma P$) for the pixel located at two pixel positions before the five pixel positions that include pixel n at the center will be based upon a single 1.0 value in the right most element 120, and thus have the value 1.0. The next pixel position will have two elements 120 with 1.0 in each one, such that the sum is 2.0. The next pixel position will have three elements 120 with 1.0 and a sum of 3.0. The next will have four and a sum of 4.0, and the next, the central pixel n, will have five elements 120 with a 1.0, and a sum of 5.0. As the pixel value sequence (1.0, 1.0, 1.0, 1.0, 1.0) continues through the box filter, the next will have four, and the next three and so on so that the sequence shown in FIG. 8 results. These further modified pixel values could be stored in frame buffer 110, replacing the original values at the corresponding positions. This shows weighting with pixel n getting the most weight, and the positions next to it getting gradually less weight in a linear manner, as illustrated by curve 202 on the weighting graph shown in FIG. 10.

FIG. 9 shows what happens when the result of FIG. 8 (values of 1.0, 2.0, 3.0, 4.0, 5.0. 4.0, 3.0, 2.0, 1.0 at nine adjacent positions, with n at the center, and with zero values for all other pixel positions) is then passed through a nine-element box filter having unity (1.0) multiplier values. The filter output 124 (ΣP) for the pixel located at four pixel positions before the nine pixel positions that include pixel n at the center will be based upon a single 1.0 value in the right-most element 120, and thus have the value 1.0. The next pixel position will have one element 120 with 1.0 and another with 2.0, such that the sum is 3.0. The next pixel position will have three elements 120 with 1.0, 2.0 and 3.0 and a sum of 6.0, and so on as shown in FIG. 8. These further modified pixel values could be stored in frame buffer 112, replacing the values at the corresponding positions. This shows weighting with pixel n getting the most weight, and the positions next to it getting gradually less weight in very close to a Gaussian distribution, as illustrated by curve 204 on the weighting graph shown in FIG. 10.

FIGS. 7-9 demonstrate how a single pixel value of 1.0 at one position gets distributed to seventeen pixels (eight on each side) after passing through two five-element box filters 114, 116 and one nine-element box filter 118, all having elements 120 with 1.0 (unity) multipliers. If an actual pixel value were used as the single input instead of 1.0, it would have been effectively multiplied times the numbers shown in FIG. 9 owing to the additions that result in the sequential passage of inputs through the elements of the box filters. If actual non-zero pixel values were located at all pixel positions in the row (or column), they would similarly be distributed over nearby pixels with the same weighting. Thus the values at $P_{n-1}$ and $P_{n+1}$ would effectively be given weights of 24 and added to 25 times the value at $P_n$, and the values at $P_{n-2}$ and $P_{m+2}$ would effectively be given weights of 22 and also added for the $P_n$ pixel position, and so on. The resulting values could then be scaled by dividing by the sum of the seventeen weights shown in FIG. 9.

FIG. 10 shows how the weighting tends to converge to a Gaussian distribution by additional passages through box filters. E.g., a fourth box filter (or even more box filters) could be used if desired.

Returning to FIG. 3, in video effects subsystem 101, original pixel values in frame buffer 10 are fed through five-element box filter 114, one row at a time, with the modified values placed at corresponding positions in frame buffer 112. The values in frame buffer 112 are then fed through five-element box filter 116, one row at a time, with the further modified values placed at corresponding positions in frame buffer 110. The further modified values in frame buffer 110 are then fed through nine-element box filter 118, one row at a time, with the result placed at corresponding positions in frame buffer 112. The resulting values, which are horizontally blurred with near Gaussian distribution, are then similarly passed through the box filters, one column at time, to provide vertically blurring as well. At some point in the processing, the values are divided by the sum of weights at divider 119 (see FIG. 9) to provide scaling.

Referring to FIG. 11, alternative video effects subsystem 140 has a single frame buffer 142 and two five-element box filters 144, 146, a nine-element box filter 148, and a divider 150 all in sequence to achieve the passes through multiple box filters without intermediate storage in frame buffers. The result, which provides horizontal blurring, would need to be stored in frame buffer 110 (after sufficient pipelining to avoid replacing data that still needs to be accessed) so that it could then be accessed in a column-by-column manner to provide vertical blurring.

Other embodiments of the invention are within the scope of the appended claims. For example, box filters having functions other than unity multipliers in each element can be employed, though this will result in a loss of efficiency. Also, one could use a single box filter, or a series of two, or three (as described above) or more (e.g., four, five, or six, or even more) in series. Also, one can apply a blur to an entire-image, as described above or to a portion of the image, by only accessing the pixel values for the pixels being blurred and some nearby positions.

What is claimed is:

1. A method of creating a blur in a digital image based upon a frame containing original pixel values at pixel positions in said image, said method comprising
    receiving two or more original pixel values in said frame of image data, and
    for each said pixel position in said digital image being blurred, calculating a blurred pixel value by applying a box filter to an original pixel value and nearby pixel values; wherein, for a given original pixel value and its nearby pixel values, the blurred pixel value corresponding to the given original pixel value is calculated without multiplying the nearby pixel values by a weight value.

2. The method of claim 1 wherein said box filter has m said elements, and wherein said receiving includes receiving said original pixel values in sequence at said box filter, and said calculating includes maintaining a current filter output value in a storage area and updating said current filter output value each time that a new pixel value in said sequence is received at said box filter by adding said new pixel value to said current filter output and subtracting the pixel value that had been received m pixel positions earlier.

3. A method of creating a blur in a digital image based upon a frame containing original pixel values at pixel positions in said image, said method comprising
    receiving two or more original pixel values in said frame of image data; and
    for each said pixel position in said digital image being blurred, calculating a blurred pixel value by sequentially applying said two or more original pixel values as inputs to a first box filter and sequentially applying the outputs of the first box filter as the inputs to a second box filter, the outputs of said first box filter being based upon said two or more original pixel values, the outputs of said second box filter being based upon the outputs of said first box filter;
    wherein outputs of the first and second box filters are calculated without performing any multiply operations.

4. The method of claim 3 wherein said calculating includes sequentially applying the outputs of the second box filter as the inputs to a third box filter.

5. The method of claim 3 wherein said box filters each have a respective number of elements, each said box filter maintaining a current filter output value in a storage area and updating said current filter output value each time that a new sequential input is received at said box filter by adding said new sequential input to said current filter output value and subtracting the input that had been received m pixel positions earlier.

6. An apparatus for creating a blur in a digital image based upon a frame containing original pixel values, said apparatus comprising
    a frame buffer configured to store said frame of original pixel values, each of which corresponds to a pixel position, and
    a box filter circuit configured to:
        receive two or more original pixel values from said frame buffer; and calculate, for a given pixel position being blurred in said digital image, a blurred pixel value that is based upon 1) the original pixel value corresponding to the given pixel position and 2) two or more pixel values having pixel positions that are nearby to the given pixel position, wherein the blurred pixel value for a given pixel position is calculated without multiplying the two or more pixel values by a weight value.

7. The apparatus of claim 6, wherein said box filter circuit has m elements, and is connected to receive said two or more original pixel values in sequence at said box filter circuit, said box filter circuit including a storage area that maintains a current filter output value, said box filter circuit including an adder and subtracter configured to update said current filter output value each time that a new pixel value in sequence is received at said box filter circuit by adding said new pixel value to said current filter output and subtracting the value that had been received m pixel positions earlier.

8. An apparatus for creating a blur in a digital image based upon a frame containing original pixel values, said apparatus comprising
a frame buffer configured to store said frame of original pixel values;
a first box filter circuit configured to:
sequentially receive two or more of said original pixel values, wherein the received original pixel values are either within a common row or common column of said frame; and calculate, using a first box filter function, a first set of output pixel values that are based upon said two or more sequentially received original pixel values; and
a second box filter circuit configured to:
sequentially receive said first set of output pixel values; and calculate, using a second box filter function, a second set of output pixel values that are based upon said first set of output pixel values;
wherein said first and second sets of output pixel values are calculated without the use of multiply operations.

9. The apparatus of claim 8 further comprising a third box filter circuit configured to sequentially receive said second set of output pixel values and calculate, using a third box filter function, a third set of output pixel values that are based upon said second set of output pixel values.

10. The apparatus of claim 8, wherein each said box filter circuit has a respective number of elements m, each said box filter circuit being connected to receive its respective inputs in sequence, each said box filter circuit including a storage area that maintains a current filter output value, each said box filter circuit including an adder and subtracter configured to update said current filter output value each time that a new sequential input is received at said box filter circuit by adding said new sequential input to said output and subtracting the input that had been received m pixel positions earlier.

11. The apparatus of claim 10, wherein the value of m for the first box filter circuit is different from the value of m for the second box filter circuit.

12. A method, comprising:
receiving a first set of pixel values corresponding to a set of pixel locations in a frame of image data, wherein each of the set of pixel locations is in a given row or a given column of the frame of image data; and
calculating a second set of pixel values from the first set of pixel values, wherein calculating the second set of pixel values includes:
for each of the first set of pixel values, computing a sum of that pixel value and a predetermined number of adjacent pixel values within the first set of pixel values, to produce one of the second set of pixel values, wherein pixel values in the second set of pixel values are blurred pixel values and are calculated without the use of multiply operations; and
using the second set of pixel values to calculate a third set of pixel values corresponding to the set of pixel locations, wherein pixel values in the third set of pixel values are also blurred pixel values.

13. The method of claim 12, wherein the first set of pixel values includes a pixel value $P_n$, wherein n corresponds to a position within the given row or given column, and wherein the predetermined number of adjacent pixel values is m, wherein m is at least 2, and wherein calculating one of the second set of pixel values includes computing a sum of $P_n$ and at least pixel values $P_{n-1}$ and $P_{n+1}$ within the given row or given column that includes $P_n$.

14. The method of claim 12, wherein the first set of pixel values includes a pixel value $P_n$, wherein n corresponds to a position within the given row or given column, and wherein the predetermined number of adjacent pixel values is m, wherein m is at least 4, and wherein calculating one of the second set of pixel values includes computing a sum of $P_n$ and at least pixel values $P_{n+2}$, $P_{n+1}$, $P_{n-1}$, and $P_{n-2}$ within the given row or given column that includes $P_n$.

15. A circuit, comprising:
a storage unit configured to sequentially receive pixel values from a frame buffer and configured to store the most recently received m pixel values, wherein the most recently received m pixel values are located in a given row or a given column of the frame buffer;
an arithmetic unit coupled to the storage unit and configured to compute, for each pixel value received from the storage unit, a sum of the received pixel value and two or more adjacent pixel values, wherein the computation of the sum for a given pixel value includes the addition of the most recently received pixel value that is stored by the storage unit, and wherein the computation of the sum for the given pixel value further includes the subtraction of the $m^{th}$ most recently pixel value that is stored by the storage unit.

16. The circuit of claim 15, further comprising control logic coupled to the arithmetic unit and configured to convey default values thereto in response to detecting that the beginning of a row or column is being processed.

17. The method of claim 16, wherein said blur operation achieves, for each pixel value in the first set of pixel values, a Gaussian or near-Gaussian distribution of adjacent pixel values.

18. A method, comprising:
performing a blur operation on a first set of pixel values in a frame of image data, wherein said performing includes, for each original pixel value in the first set of pixel values:
computing a blurred pixel value by summing the original pixel value and pixel values adjacent to the original pixel value in the frame, wherein the blurred pixel value corresponds to the same pixel location in the frame as the original pixel value and is computed without multiplying the adjacent pixel values by corresponding weight values.

19. The method of claim 18, wherein said summing is performed by a first box filter function, and wherein, for a given original pixel value in the first set of pixel values, the adjacent pixel values are within the same row or column of the frame of image data.

20. The method of claim 19, wherein said performing further includes, for each computed blurred pixel value, summing that blurred pixel value and its adjacent blurred pixel values to compute a twice-blurred pixel value, wherein said summing of each blurred pixel values is performed by a second box filter function that does not involve multiplying the adjacent blurred pixel values by corresponding weight values.

21. The method of claim 20, wherein the first box filter function has a different number of elements from the second box filter function.

22. The method of claim 20, wherein said performing further includes scaling each twice-blurred pixel value to compute a corresponding final blurred pixel value.

23. A system comprising:
a processor; and
a memory storing program instructions that are executable by the processor to:
perform a blur operation on a first set of pixel values in a frame of image data, wherein the blur operation includes summing, for each original pixel value in the first set of pixel values, the original pixel value and pixel values adjacent to the original pixel value in the frame to compute a blurred pixel value, wherein each said blurred pixel value is generated without multiplying the adjacent pixel values by corresponding weight values.

24. A system comprising:
a processor; and
a memory storing program instructions that are executable by the processor to:
perform a blur operation on a first set of pixel values in a frame of image data by applying a first box filter function and providing the output of the first box filter function to a second box filter function, wherein each of the box filter functions produces blurred pixel values without performing multiply operations.

25. The system of claim 24, wherein the blur operation includes one or more additional box filter functions, each of which operates on the output of a previous box filter function.

26. The system of claim 25, wherein the box filter functions do not all have the same number of elements.

27. The system of claim 24, wherein the first and second box filter functions have a different number of elements.

28. A method for performing a box filter function as part of a blur operation, the method comprising:
receiving a set of pixel values from a frame of image data, wherein pixels within the set of pixel values are within a given row or a given column of the frame and include first and second pixel values;
maintaining a current set of m of the received pixel values;
generating, from a current accumulation value, a new current accumulation value by adding to and subtracting, respectively, the most and least recently received ones of the set of m pixel values, wherein the new current accumulation values is a blurred pixel value, is provided as an output of the box filter function as a blurred pixel value, and corresponds to the first pixel value.

* * * * *

UNITED STATES PATENT AND TRADEMARK OFFICE
CERTIFICATE OF CORRECTION

PATENT NO. : 7,466,870 B2
APPLICATION NO. : 10/345851
DATED : December 16, 2008
INVENTOR(S) : Jeffrey F. Hatalsky It is certified that error appears in the above-identified patent and that said Letters Patent is hereby corrected as shown below:

Column 6:

Lines 19-20, please delete "wherein said box filter has m said elements" and substitute --wherein said box filter has m elements--.

Lines 20-21, please delete "wherein said receiving includes receiving said original pixel values" and substitute --wherein said receiving includes receiving said two or more original pixel values--.

Signed and Sealed this

Eighth Day of September, 2009

David J. Kappos
*Director of the United States Patent and Trademark Office*